April 18, 1944.  A. B. WERDEHOFF  2,347,141
MOTOR VEHICLE HEATING SYSTEM
Filed Feb. 6, 1941
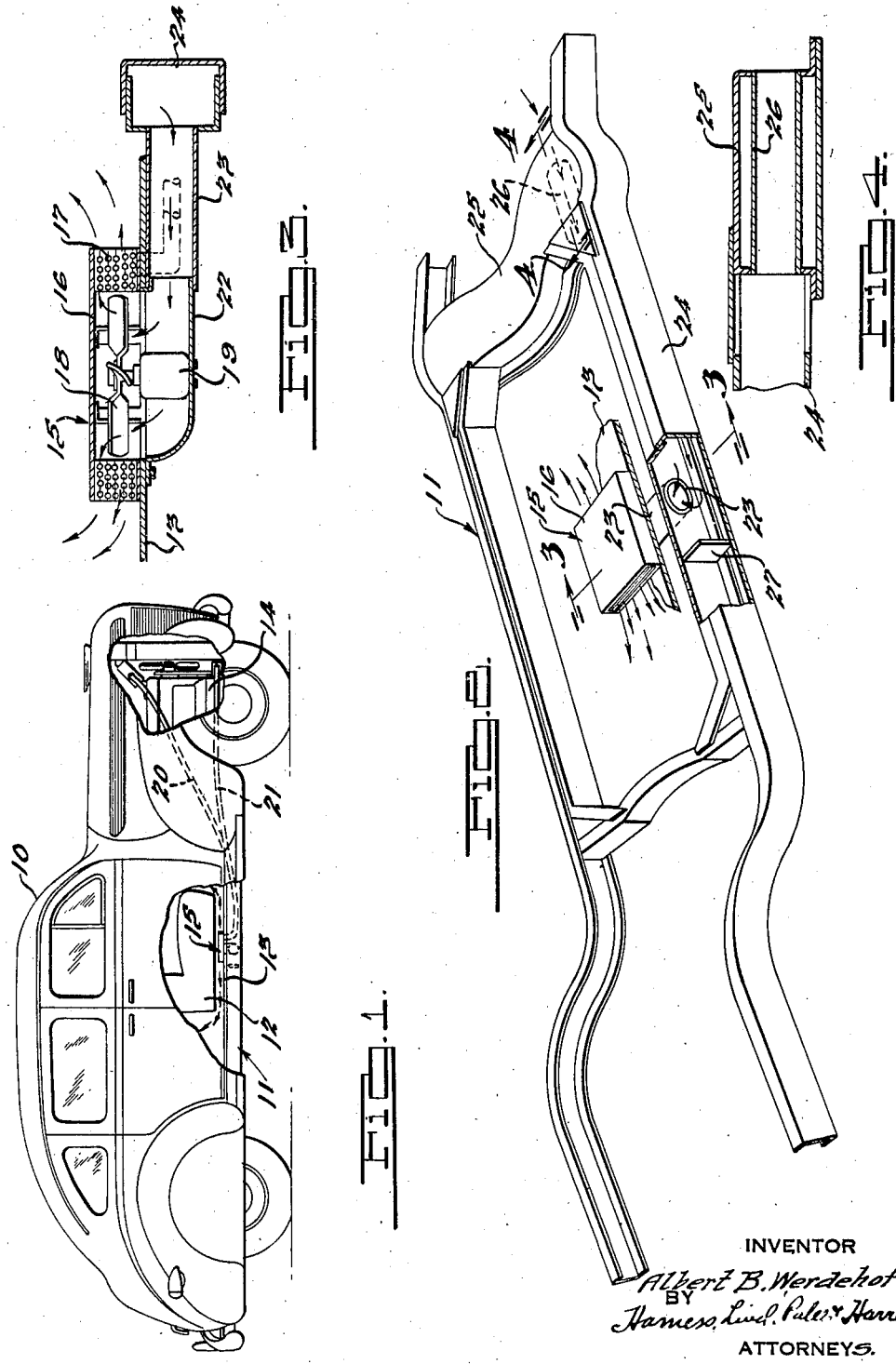
INVENTOR
Albert B. Werdehoff
BY
Harness, Dickey, Pierce & Harris
ATTORNEYS.

Patented Apr. 18, 1944

2,347,141

UNITED STATES PATENT OFFICE 2,347,141

MOTOR VEHICLE HEATING SYSTEM

Albert B. Werdehoff, Detroit, Mich., assignor to Chrysler Corporation, Highland Park, Mich., a corporation of Delaware Application February 6, 1941, Serial No. 377,681

2 Claims. (Cl. 98—2)

This invention relates to an improved heating system, especially adapted for motor vehicles, and more particularly to supplying of fresh air thereto.

An object of the invention is the provision of improved means for conducting fresh air to a heating unit and particularly to a unit located beneath a vehicle passenger seat, between the latter and the vehicle floor.

More particularly it is an object of the invention to utilize a portion of the vehicle frame as a means by which fresh air is conducted to a heater unit and especially to a unit located as aforesaid.

Another object of the invention is the novel arrangement of a heater unit and a hollow vehicle frame side rail whereby fresh air is admitted to the latter and conducted to the unit.

Other objects of the invention will be more apparent from the following description taken in connection with the accompanying drawing in which:

Fig. 1 is a side elevational view of a motor vehicle including the improved heating system, parts being broken away to more fully illustrate the latter.

Fig. 2 is a view in perspective illustrating the improved relationship of the heater unit and vehicle frame.

Fig. 3 is a sectional elevational view taken on line 3—3 of Fig. 2.

Fig. 4 is a sectional view taken on line 4—4 of Fig. 2.

Referring to the drawing, there is shown a motor vehicle having a closed body 10 of the sedan type mounted on a chassis frame 11, the body including a front seat 12, spaced vertically from the floor 13, and a further seat (not shown) in the compartment immediately to the rear of the seat 12. The vehicle is propelled by an internal combustion engine 14 having a cooling system for the circulation of a cooling medium such as water, it being understood that the cooling medium has a temperature during engine operation of a relatively high degree such that air can be heated therefrom.

In order to effectively heat both the front and rear passenger compartments by a single heating unit, the latter is positioned in the space between the front seat and the floor, this location of the heater also serving to clear the front compartment for full utilization thereof by the occupants.

The heating unit 15 includes casing 16, having an opening in opposed walls thereof for discharging heated air into the front and rear compartments as indicated more particularly in Figs. 1 and 2. A heat exchanging core 17 is disposed in the casing 16 and may be of any suitable design and shape for the circulation therethrough of the engine cooling medium. In a heater unit of the type herein contemplated the core may be so shaped that air may be passed therethrough and discharged in opposite directions. Thus the core has spaced sections as indicated in Fig. 3 with a fan 18 therebetween driven by an electric motor 19. The case 16 is in communication with the engine cooling system by means of the conduits 20 and 21.

Air to be heated is admitted to the casing 16 through a duct 22 secured to the vehicle floor 13 in registering relation with an opening therein and is forced through the opposed portions of the core for heating thereby by the action of the fan 18, the duct 22 supporting the motor and fan.

It has been found desirable to admit fresh air to the heater rather than merely recirculate the previously heated air within the body and for this purpose the inlet duct 22 is connected by a relatively short conduit 23 with a side rail 24 which defines a closed box in cross section throughout a substantial portion of the length thereof, this rail comprising a pair of channel shaped members opening one toward the other, one of these members having an opening in the web thereof into which the conduit 23 extends.

The rail 24 and its companion rail are connected adjacent the forward ends thereof by a cross member 25 defining a closed box in cross section, as shown in Fig. 4, opposed walls of the member 25 having aligned openings. A tube 26 is supported in the wall openings and is adapted to admit fresh air through the cross member 25 to the hollow side rail 24 and thence through the conduit 23 to the duct 22, as indicated by the arrows in Figs. 3 and 4. Passage of air lengthwise of the rail 24 is blocked by a partition 27 located rearwardly of the point at which the conduit 23 communicates with the rail. It will be understood, of course, air can be admitted to and to the rail 24 in a manner other than that shown, it being preferable to so locate the air inlet that the air admitted will not be laden with foreign matter, such as dust, circulated by vehicle travel.

Although but one embodiment of the invention is herein shown and described, it will be understood that various changes in the size, shape and arrangement of the parts may be made without departing from the spirit of the invention or from the scope of the appended claims.

I claim:

1. In a motor vehicle body including a floor, a heating unit within said body for supplying heated air thereto, said floor having an opening therein for admitting air therethrough to said heating unit, a chassis frame including a pair of side rails and a connecting cross member disposed adjacent the front of the vehicle, one of said side rails including a hollow air conducting portion, said cross member including a hollow air conducting portion communicating with atmosphere and with said hollow rail portion, and means for conducting air from said hollow rail portion to said body opening.

2. In a motor vehicle including a body having a seat supported in spaced relation to the floor and a chassis frame structure including spaced side rails and a connecting cross member adjacent the front of the vehicle having a hollow portion; a heating unit disposed between the seat and floor for supplying heated air to the body and having an air inlet through the floor, an air conducting conduit extending through the hollow portion of said cross member and having one end thereof communicating with atmosphere, one of said side rails having a hollow portion communicating with said conduit for receiving air therefrom, and a second air conducting conduit communicating with said hollow rail portion and said air inlet.

ALBERT B. WERDEHOFF.